United States Patent [19]

Baum et al.

[11] Patent Number: 4,979,207
[45] Date of Patent: Dec. 18, 1990

[54] METHOD OF PROCESSING CELLULAR TELEPHONE CALL DETAIL DATA FOR BILLING MULTI-LINE CUSTOMERS FOR CELLULAR TELEPHONE SERVICES

[75] Inventors: David M. Baum, Alexandria, Va.; Andrea E. Bradshaw, Schaumburg; Christopher G. McClain, Palatine, both of Ill.

[73] Assignee: Motorola, Inc., Schaumburg, Ill.

[21] Appl. No.: 473,787

[22] Filed: Feb. 1, 1990

[51] Int. Cl.⁵ ..................... H04M 7/16; H04M 15/06
[52] U.S. Cl. .................................. 379/112; 379/120; 379/126; 379/135
[58] Field of Search ............... 379/111, 116, 119, 120, 379/121, 126, 127, 134, 135, 133, 112, 59

[56] References Cited
U.S. PATENT DOCUMENTS
4,640,986  2/1987  Yotsutani et al. .............. 379/126 X Primary Examiner—Stafford D. Schreyer
Attorney, Agent, or Firm—Rolland R. Hackbart

[57] ABSTRACT

A unique cellular telephone billing system (100) processes call detail records (102) of cellular telephone calls made by users of multi-line customers to produce invoices and reports. The call detail records (301 and 302) for each user of a multi-line customer include a unique key identification number (311 and 321) and may include an information format (401 and 402) having variable-length sub-fields (411–415 and 421–423). Call detail records (102) with key identification numbers are pooled into files (110) and then sorted for each multi-line customer by key identification number and corresponding information format to produce consolidated billing and usage information for all of the cellular telephones as well as individual invoices for each of user-employee of each multi-line customer.

8 Claims, 4 Drawing Sheets

FIG. 4

INFORMATION FORMAT-MULTI-LINE CUSTOMER A 401

| 411 | 412 | 413 | 414 |
|---|---|---|---|
| PRODUCT (3) | DIVISION (3) | REGION (3) | DISTRICT (3) |

INFORMATION FORMAT-MULTI-LINE CUSTOMER B 402

| 421 | 422 | 423 | 424 |
|---|---|---|---|
| REGION (3) | DEPARTMENT (4) | EMPLOYEE NUMBER (8) | FILLER (0) |

FIG. 3

CALL DETAIL RECORD 301

| 311 | 312 | 313 | 314 | 315 | 316 | 317 | 318 |
|---|---|---|---|---|---|---|---|
| KEY IDENTIFICATION NUMBER | IDENTIFICATION FORMAT | CELLULAR TELEPHONE FORMAT | ELECTRONIC SERIAL NUMBER | CALLED NUMBER | CALL DATE | CALL ORIGINATION TIME | CALL DURATION |

CUSTOMER DETAIL RECORD 302

| 321 | 322 | 323 | 324 | 325 | 326 | 327 | 328 | 329 | 330 | 331 | 332 |
|---|---|---|---|---|---|---|---|---|---|---|---|
| KEY IDENTIFICATION NUMBER | IDENTIFICATION FORMAT | BILLING ACCOUNT NUMBER | CELLULAR TELEPHONE NUMBER | ELECTRONIC SERIAL NUMBER | RATE PLAN | FEATURES PLAN | AIR TIME CHARGES | LAND LINE CHARGES | FEATURES CHARGES | ROAMING CHARGES | TAXES |

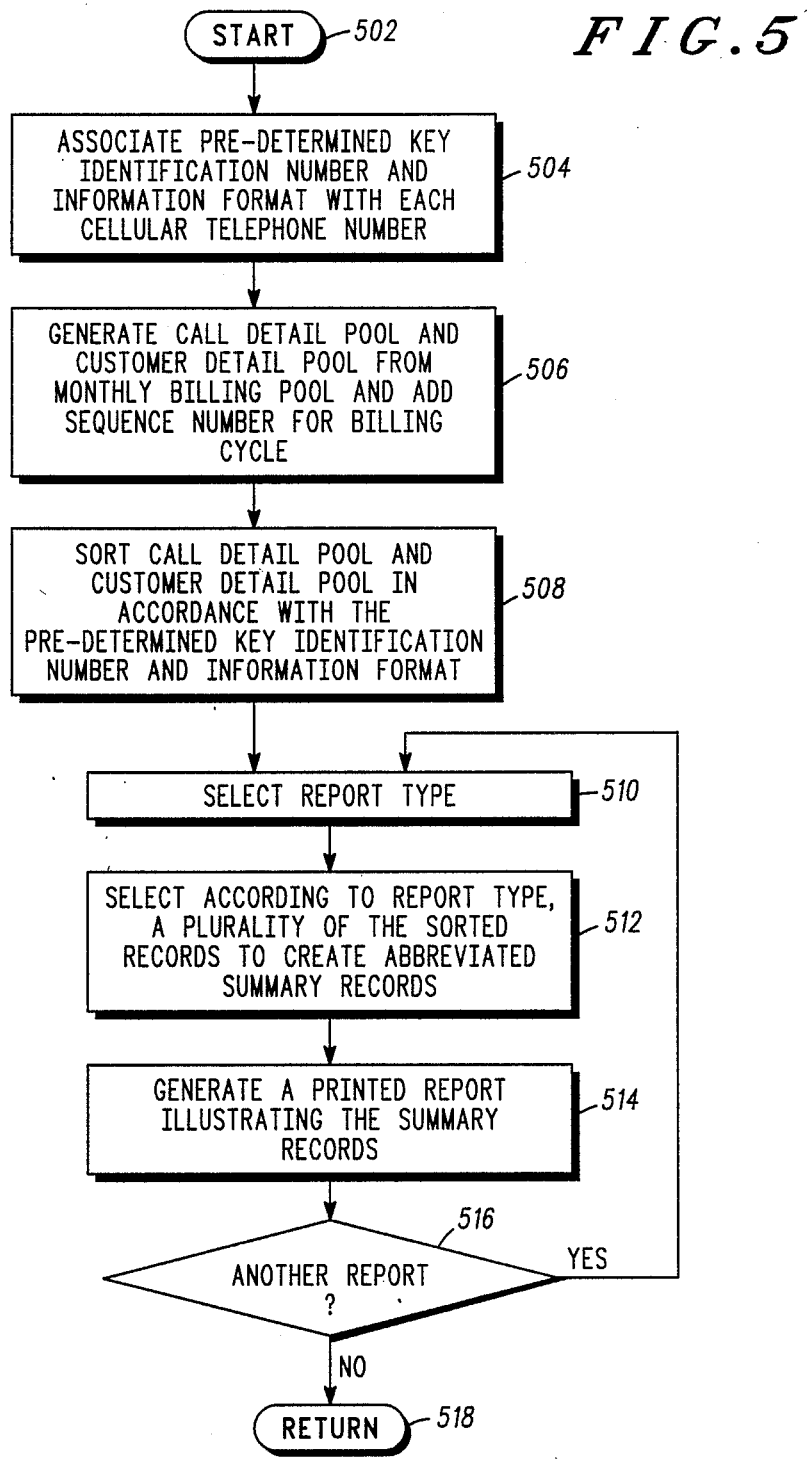

METHOD OF PROCESSING CELLULAR TELEPHONE CALL DETAIL DATA FOR BILLING MULTI-LINE CUSTOMERS FOR CELLULAR TELEPHONE SERVICES

BACKGROUND OF THE INVENTION

The present invention is generally related to cellular telephone billing systems, and more particularly to a method of processing cellular telephone call detail data for billing multi-line customers for cellular telephone services.

Cellular telephone billing systems currently accept cellular telephone call detail data on a periodic basis by electronic transmission or on magnetic media from cellular telephone carriers, process the call detail data on the tapes, and typically generate monthly invoices for the user associated with each cellular telephone number. For a multi-line customer owning a large number of cellular telephones with associated cellular telephone numbers, a different monthly invoice (in varying formats) is typically generated for each of the cellular telephone numbers. As a result, it is very difficult for a multi-line customer to determine on a monthly basis the total bill for cellular telephone services provided to its users and many other criteria needed to efficiently and cost effectively make use of the cellular telephones it owns. Therefore, for the foregoing reasons, there is a need to provide on a regular basis consolidated cost and usage information for the cellular telephones owned by a multi-line customer.

OBJECTS OF THE INVENTION

Accordingly, it is an object of the present invention to provide an improved method for billing a multi-line customer for cellular telephone services.

It is another object of the present invention to provide a unique method for billing multi-line customers for cellular telephone services, wherein each customer has a unique key identification number and one or more users of each customer has an information format with variable-length fields for defining data management and reporting functions.

BRIEF DESCRIPTION OF THE DRAWINGS

FIG. 3 illustrates a call detail record and a customer detail record for a key identification number and corresponding information format.

FIG. 4 illustrates two information formats for corresponding key identification numbers.

FIG. 5 is a flow diagram of the process for producing selected reports for a multi-line customer having a pre-assigned key identification number and pre-assigned information format.

DETAILED DESCRIPTION OF THE PREFERRED EMBODIMENT

Figure 1:
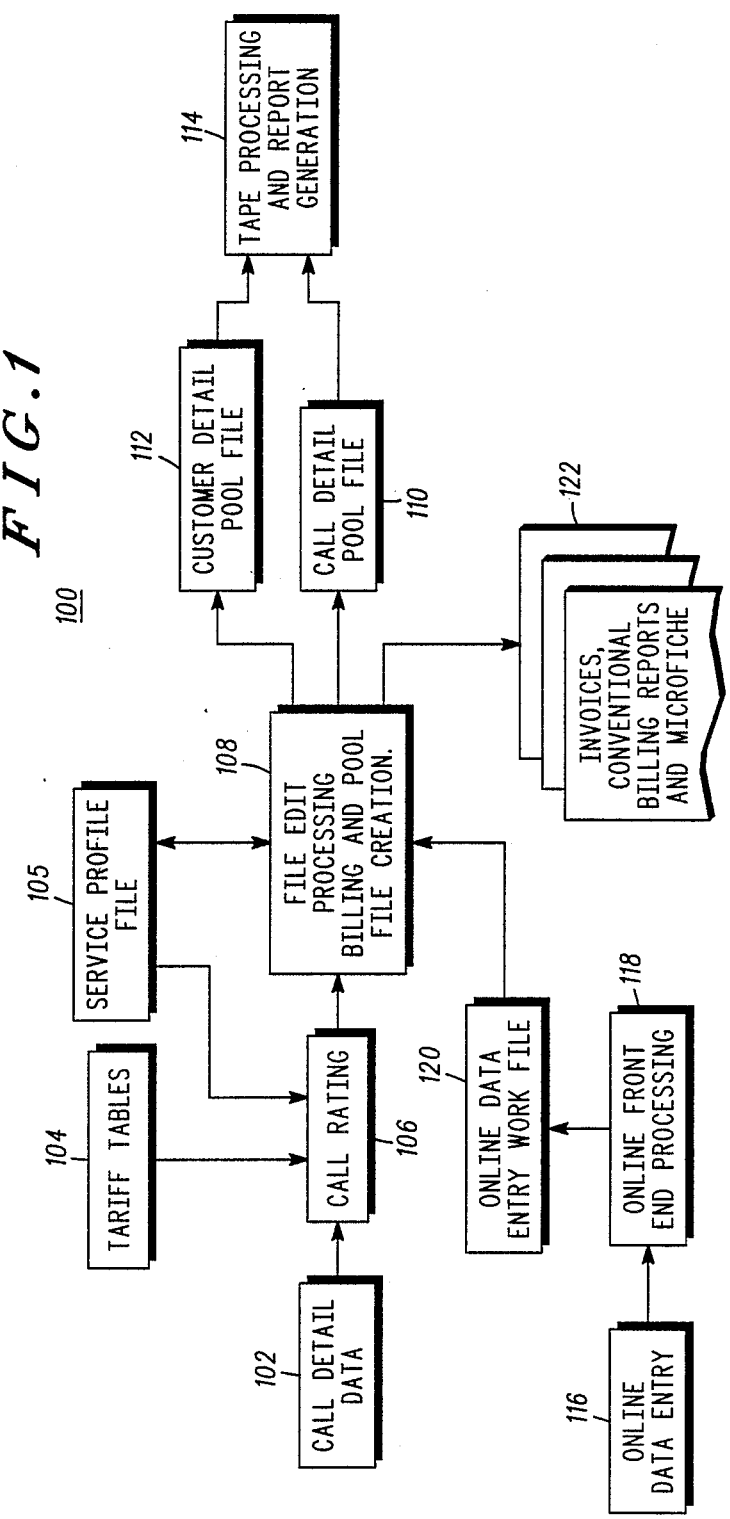
FIG. 1 is a diagram of a cellular telephone billing system embodying the present invention.

Referring to FIG. 1, there is illustrated a diagram of a cellular telephone billing system 100 embodying the present invention. Billing system 100 process call detail records of cellular telephone calls made by cellular subscribers or users in various cellular systems operated by cellular carriers throughout the United States and/or other countries of the world. For each cellular telephone call made by or to a user, at least one call detail record is created in the cellular system processing the call. Each such call detail record includes information relating to the call, including, but not limited to, the cellular telephone number, the electronic serial number of the cellular telephone, the called telephone number, the time the call was placed, the time duration of the call, and other information depending on the cellular carrier processing the call. On a periodic basis, the call detail records accumulated by a cellular carrier are processed to produce cellular telephone bills for each user for which calls were processed.

A reseller of cellular services obtains cellular telephone numbers from carriers in a number of different cities. The reseller provides telephone numbers directly to a user and then bills the user typically on a monthly basis for the telephone calls made by the user. In order for the reseller to generate the monthly bills, billing system 100 is utilized to process on a periodic basis call detail records from multiple carriers for each user telephone number billed by the reseller.

For a multi-line customer which owns a number of cellular telephones operated by its user-employees, it is desirable to receive consolidated billing and usage information for all of its cellular telephones as well as individual bills for each of its user-employees. According to the present invention, a unique key identification number is associated with each multi-line customer. An information format with variable-length fields is associated with one or more user-employees of a multi-line customer so that call detail records may be pooled and processed for providing consolidated billing and usage information for all of its cellular telephones as well as individual bills for each of its user-employees. Illustrative call detail records 301 and 302 including the key identification number and the information format are shown in FIG. 3. As illustrated in FIG. 4, the number and length of the sub-fields in the information formats 401 and 402 can be tailored to the specific data management and reporting functions desired by the multi-line customer.

In the diagram of FIG. 1, call detail data 102 is received from cellular carriers in many different cities or geographical areas. The call detail data 102 from each carrier may be received on magnetic tapes, cartridges, data sets or other suitable storage media, may be received electronically, and may be received in a number of different data formats. Next, at block 106, the call detail data 102 is batch processed on a periodic basis to reformat, rate, add the user's key identification number and information format, and consolidate the new call detail data with the previous data, using tariff tables 104 and service profile file 105.

Next, at block 108, according to the present invention, the previously collected call detail data from block 106 may be processed to select all records including a key identification number and create two data pools or files, called the call detail file 110 and the customer detail file 112. As illustrated in FIG. 3, records 302 in customer detail file contain customer related information, including, but not limited to, the billing account number 323, cellular telephone number 324, electronic serial number 325 of a cellular telephone, rate plan 326, features plan 327, air time charges 328, landline charges 329, feature charges 330, roaming charges 331, and taxes 332. As illustrated in FIG. 3, records 301 in call detail file contain information related to the calls placed by the cellular telephone, including, but not limited to, cellular telephone number 313, electronic serial number 314 of a cellular telephone, the called telephone number 315, the date 316 the call was placed, the time 317 the call was placed, and the duration 318 of the call.

The customer detail file 118 and call detail file 110 may be outputted on tapes or other suitable media or may be transmitted electronically and are further processed at block 114. In the preferred embodiment, the processing of blocks 106 and 108 is performed using conventional billing software which has been modified to include the ability to associate key identification numbers and information formats for all cellular telephone numbers of each multi-line customer. One source of such software is Cincinnati Bell Information Systems, Inc.

Online data entry at block 116, which utilizes online front end processor 118 to produce an online data entry work file 120 which is transferred to block 108 where it is utilized to maintain service profile file 105, to provide and/or edit the unique key identification number and the information format for cellular telephone numbers of a new multi-line customer and/or users, and to correct or provide additional call detail data.

Returning to block 108, the call detail records may be processed further to create user invoices, pre-selected management reports, and fiche data sets 122.

Figure 2:
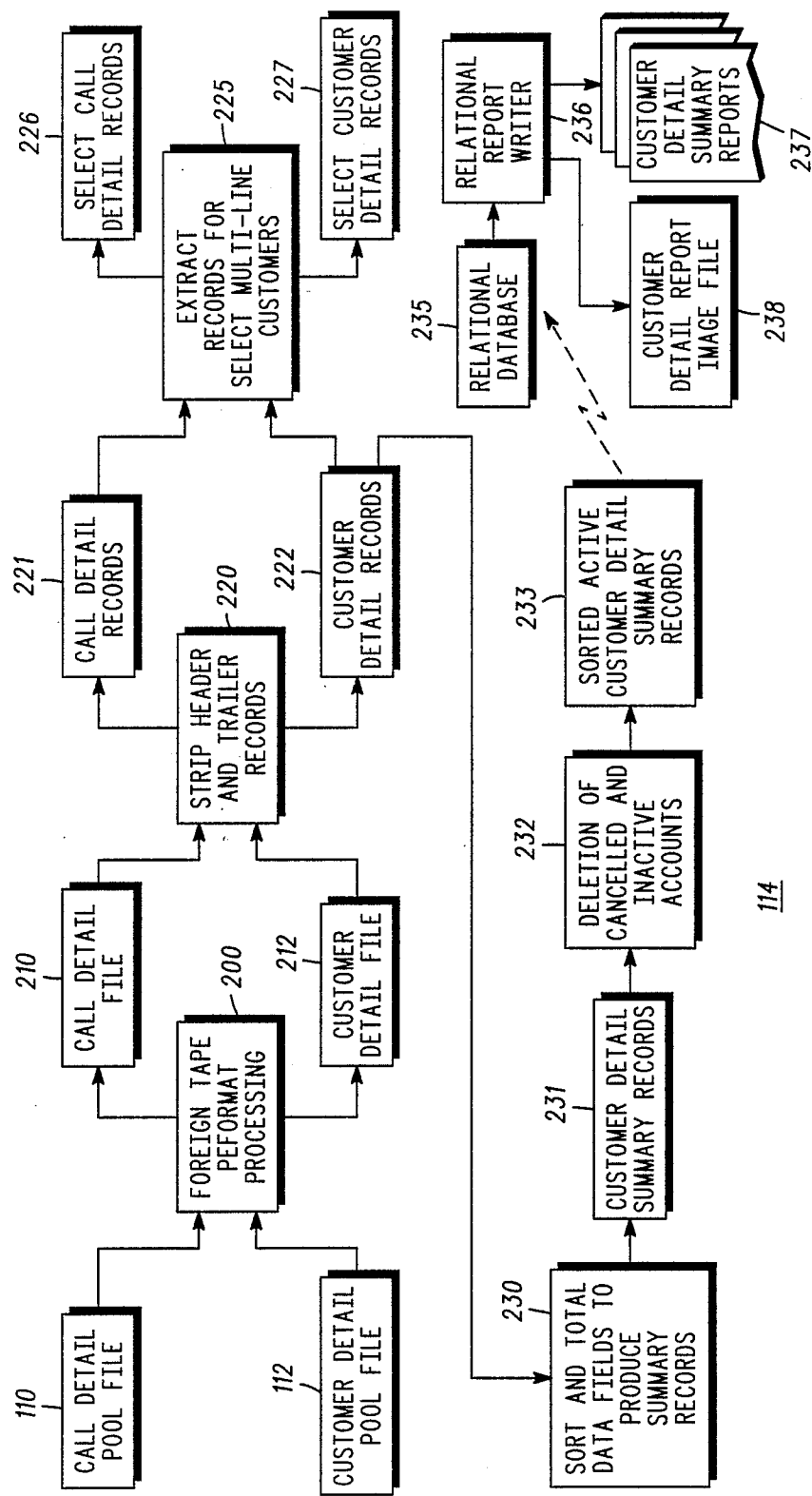
FIG. 2 is a flow diagram for processing call detail and customer detail files produced in the cellular telephone billing system in FIG. 1.

Referring next to FIG. 2, there is illustrated a flow diagram for block 114 in FIG. 1, where further processing of tapes containing the call detail file 110 and customer detail file 112 is performed. Upon receipt of new tapes containing the call detail and customer detail files 110 and 112, the tapes are processed at block 200 using a mainframe computer, such as an International Business Machines 3090, to produce internally formatted copies of the call detail file 210 and the customer detail file 212. Once copies 210 and 212 are made, tapes 110 and 112 are placed in a fire-proof vault for safe storage.

Next, at block 220, a file maintenance utility, such as the utility called "File-AID" available from COMPUWARE, is executed on the mainframe computer to produce subsequent generations of 221 and 222 of the call detail file 210 and customer detail file 212, respectively, in which the header and trailer records have been removed. Then, at block 225, a software application program is executed on the mainframe computer to create, on the basis of the key identification number for a selected multi-line customer, tapes 226 and 227 from abbreviated files 221 and 222, respectively, which contain selected data relating to the users of that multi-line customer.

Next, at block 230, another software application program is executed on the mainframe computer for sorting the records in the abbreviated customer detail file 222 and computing the total values of the quantities in certain data fields, such as, for example, the data fields for roaming charges, air-time charges, and landline charges to produce a sorted customer detail summary file 231. This software application program also incorporates into file 231 other selected information from the customer detail records from file 222, and replaces embedded market identifiers of the conventional billing software in file 222 with different market identifiers using a general usage table. Then, at block 232, another software application program is executed on the mainframe computer for deleting records for cancelled users and for users with no account level charges in file 231.

Thereafter, the data is transferred from the mainframe computer to a personal computer 233 (such as an Intel 80X86 microprocessor based personal computer using MS-DOS or PC-DOS operating system), using a commercially available file transfer program (such as the program called "SIM/XFER" available from Simware, Inc.). The data is then transferred to a relational data base structure 235 (such as that provided by dBASE III Plus from Ashton Tate Corporation). Next, at block 236, data 235 is sorted and totaled on the personal computer and reports 237 are printed using a report program generator (such as the program called "R & R Relational Report Writer" available from Concentric Data Systems, Inc.). The report program generator 236 includes a process such that sorting is performed for each multi-line customer using the key identification number and information format for that customer. Print images of some of the reports are uploaded from the relational data base 235 to the mainframe computer using a file transfer program. The uploaded reports may then be transferred to individual mainframe accounts 238 on another mainframe computer.

Referring next to FIG. 4, there are illustrated two information formats 401 and 402 for key identification numbers for multi-line customer A and multi-line customer B, respectively. According to the present invention, the information format is a data field which can be sub-divided into a variable number of sub-fields each having different lengths. In the preferred embodiment, the information format is a fifteen character field with four sub-fields of variable length. Information format 401 has three sub-fields 411–413 having three characters and one sub-field 414 having six characters. Information format 402 has four sub-fields 421–424 having three, four, eight, and zero characters, respectively. For the sales organization of customer A, sub-fields 411, 412, 413 and 414 of information format 401 are associated with data fields for product, division, region and district, respectively. For the service organization of customer B, sub-fields 421, 422 and 423 of information format 402 are associated with data fields for region, department, and employee number, respectively. Sub-field 424 is a zero length filler field. As illustrated by information formats 401 and 402, the sub-fields selected for a particular multi-line customer may be varied in length to suit that customer's specific needs.

The structure (sizing of sub-fields) of an information format is specific to a multi-line customer, and therefore, is also specific to the associated key identification number. The data contained within the information format sub-field in call detail and customer detail records is specific to one or more users.

Referring next to FIG. 5, there is illustrated a flow diagram of the process for producing selected reports for a multi-line customer having a predetermined key identification number and one or more information formats (with same number of sub-fields but different information in each). The process is entered at START block 502 and proceeds to block 504, where the predetermined key identification number and information format are associated with each cellular telephone number or user of a multi-line customer. Next, at block 506, the call detail and customer detail files are generated from the monthly billing pool. Also, a sequence number for the billing cycle is added to each record to identify that billing cycle. Then, at block 508, the call detail and customer detail files are sorted in accordance with the predetermined key identification number and information format of the multi-line customer.

Next, at block 510, a report type is selected for a number of different reports each including a set of data sub-fields from the call detail and customer detail files. Then, at block 512, a plurality of the sorted records are selected on the basis of the desired report type to create abbreviated summary records. Last, at block 514, a printed report is generated illustrating in graphic form the selected summary records. Thereafter, at block 516, a check is made to determine if another report type has been selected. If so, YES branch is taken back to block 508 to repeat block 508–514 for another report type. If another report type has not been selected, NO branch is taken form block 516 to block 518 to return to other tasks.

In summary, a unique billing system has been described for billing multi-line customers for cellular telephone services, wherein each user has a unique key identification number and may have an information format with variable-length and variable-content fields for defining data management and reporting functions. As a result, a customer owning a number of cellular telephones may be assigned a predetermined identification number and corresponding information format for obtaining consolidated billing and usage information for all of its cellular telephones as well as individual bills for each of its users.

We claim:

1. A method of cellular radiotelephone user billing from a multiplicity of user records from one or more cellular systems gathered in a billing pool, said method comprising the steps of:

creating a key identification number for a group of users and an information format having at least one sub-field for at least one user of said group of users;

associating said key identification and said information format with each user record in the billing pool;

obtaining from the billing pool at least one call record and at least one call detail;

sorting said at least one call record and said at least one call detail in accordance with said key identification number and said information format;

selecting a plurality of user record types from the sorted call record and call detail to create an abbreviated summary record file; and presenting said abbreviated summary record file in human perceptible form.

2. The method according to claim 1, further including the step of creating a sequence number associated with a selected radiotelephone user.

3. The method according to claim 2, wherein said step of sorting further includes the step of sorting said at least one individual call record and said at least one call detail in accordance with said sequence number.

4. A cellular radiotelephone billing system for processing cellular radiotelephone call data including a multiplicity of user records from one or more cellular systems gathered in a billing pool for billing users, said system comprising:

means for creating a key identification number and an information format for a group of users;

means for associating said key identification and said information format with each user record in the billing pool;

means for obtaining from the billing pool at least one call record and at least one call detail;

means for sorting said at least one call record and said at least one call detail in accordance with said key identification number and said information format;

means for selecting a plurality of user record types to create an abbreviated summary record file; and means for presenting said abbreviated summary record file in human perceptible form.

5. A method of processing with computing means cellular radiotelephone user billing records from one or more market areas each corresponding to a different cellular system, each billing record associated with a user radiotelephone number, said method comprising the steps of:

adding to each user billing record for at least a preselected group of users, a key identification number and an information format having at least one sub-field associated with at least one user of said preselected group of users;

adding to each user billing record a sequence number identifying the billing cycle;

sorting the user billing records by at least one key identification number to produce a consolidated file of user records for said at least one key identification number;

creating a user data file of records and a call detail data file of records from said consolidated file;

selecting information from the records in said user data file and/or call detail data file in accordance with said information format and producing summary records containing the selected information; and presenting said summary records in human perceptible form.

6. The method according to claim 5, wherein said step of adding further includes the step of adding to each user billing record a sequence number identifying the billing cycle.

7. The method according to claim 6, wherein said step of sorting further includes the step of sorting said user data file and said call detail data file in accordance with said sequence number.

8. A key account billing controller for use with a digital computer, the controller comprising:

a computer program storage medium having a computer program to be executed by the digital computer stored thereon, the computer program comprising:

first means for processing cellular radiotelephone call data including a multiplicity of user records from one or more cellular systems gathered in a billing pool for billing users and adding to each user billing record a key identification number and an information format having at least one sub-field associated with at least one user; and second means for sorting the user billing records by at least one key identification number to produce a file user records for said at least one key identification number, selecting information from the user billing records in said file in accordance with said information format, producing summary records containing the selected information, and presenting said summary records in human perceptible form.

* * * * *